Feb. 26, 1957 J. G. IMPARATO 2,782,957
CYLINDER CLAMPS
Filed March 22, 1954
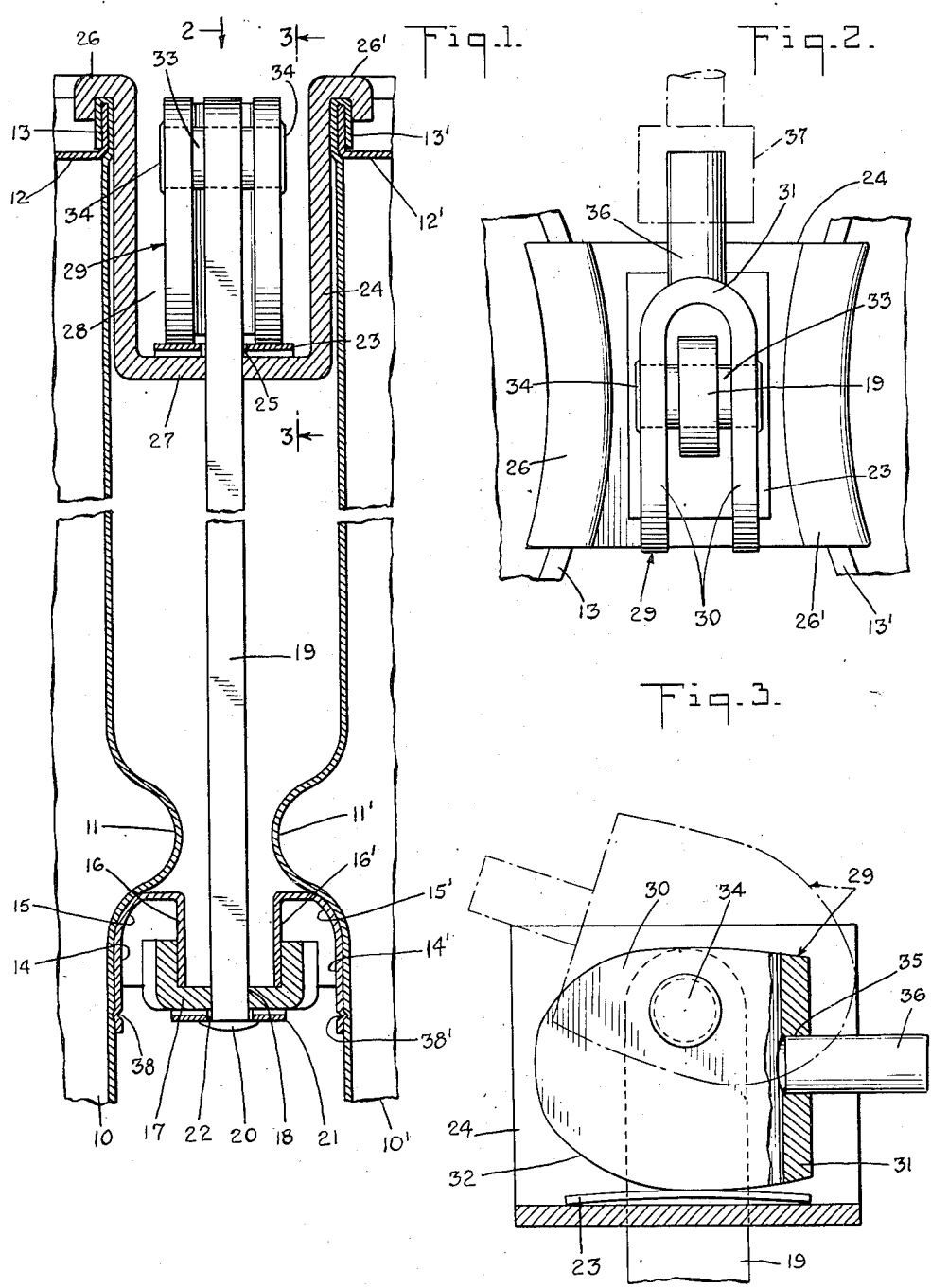
INVENTOR
JACK G. IMPARATO
BY
Howard T. Thompson
ATTORNEY United States Patent Office 2,782,957
Patented Feb. 26, 1957

2,782,957
CYLINDER CLAMPS

Jack G. Imparato, Brooklyn, N. Y., assignor of one-half to John J. Imparato, Brooklyn, N. Y.

Application March 22, 1954, Serial No. 417,744

9 Claims. (Cl. 220—23.4)

This invention relates to clamp devices for use in securing cylinders, drums and like containers in coupled relationship to each other and, particularly, cylinders requiring the use of clamp rings thereon, which facilitate the use of clamps in securing a pair of cylinders together.

More particularly, the invention deals with clamps of the character described, including a recessed clamp plate, within which the operative elements of the clamp are housed in order to maintain the clamp below end surfaces of the cylinders, in conjunction with which they are employed.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a diagrammatic sectional view through adjacent portions of a pair of cylinders, illustrating one of my improved clamps coupled therewith, with portions of the clamps shown in elevation.

Fig. 2 is a view looking in the direction of the arrow 2 of Fig. 1 of the drawing and showing part of adjacent cylinders; and Fig. 3 is a sectional view on the line 3—3 of Fig. 1 showing only a part of the construction and with part of the construction broken away and in section.

In the accompanying drawings, the showing is diagrammatic, particularly with respect to spacing of parts and this is done for sake of clarity in the illustration. In reality, the various parts, particularly, as viewed in Fig. 1 of the drawing, will be in closer relationship to each other.

In Fig. 1 of the drawing, I have shown at 10, 10' a pair of adjacent cylinders, or drums, of the type and kind usually employing the outwardly extending annular or circumferential beads 11, 11' in spaced relation to the closed ends 12, 12'. These closed ends 12, 12' are recessed within the interengaging raised flange portions 13, 13'. At 14, 14' I have shown a pair of coupling rings suitably mounted upon the cylinders, or drums, 10, 10', below the beads 11, 11' with respect to the ends 12, 12'. The rings are preferably fashioned, as seen at 15, 15', to seat upon the beads and these rings have depending or downwardly directed flanges or rim portions 16, 16', as clearly noted in Fig. 1 of the drawing.

At 17 I have shown a bottom clamp plate which is of channel cross-sectional form, as clearly noted in Fig. 1 of the drawing and this plate has curved flanged sides to conform with the curvature of the flanges 16, 16' and engage said rims, as clearly shown, the plate 17 having an oblong rectangular center aperture 18, in which an elongated clamp bar 19 is mounted. The bar has a flattened head 20, at its lower end, which seats against a bowed spring plate element 21 which engages the plate 17, the element 21 having an aperture 22 for reception of the bar 19. The element 21 is generally of the contour of a similar plate element 23, note Fig. 3, which operatively engages a deep channelled clamp plate 24 at the upper end of the bar 19.

The element 23 is also apertured as seen at 25 to receive the bar 19.

The plate 24 has, at its upper end portion, outwardly and downwardly extending hook-shaped coupling flanges 26, 26' which are curved to conform with the contour of the flanges 13, 13', as clearly noted in Fig. 2 of the drawing. The curvature of the flanges 26, 26' form outwardly flared ends on the plate 24 and it will be apparent that the plate 17 has the same general contour. The spacing of the hook-shaped flanges 26, 26' from the bottom crosshead 27 of the clamp plate 24 is such as to provide a deep channel 28, clearly noted in Fig. 1 of the drawing, within which a yoke-shaped coupling cam member 29 of the clamp unit is housed when the clamp unit is in operative position, as illustrated in Fig. 1 of the drawing.

The cam member 29 is U-shaped in cross-sectional form, in other words, comprises side plates 30 joined at one end by a crosshead 31, note Fig. 2, and the plates 30 have eccentric cam surfaces, one of which is indicated at 32 in Fig. 3 of the drawing. The eccentricity of the surfaces 32 is with respect to the pivot pin 33, on which the cam rotates, said pin 33 being mounted in the upper end portion of the bar 19. The pin has flattened riveted ends, as seen at 34 in Fig. 1, in order to maintain the cam 29 in close proximity with respect to the clamp plate 24. Here this close clearance is highly exaggerated in the accompanying drawings.

The crosshead 31 of the cam 29 has an aperture 35, in which is fixed an outwardly protruding key pin 36, with which a suitable operating tool is detachably coupled. The socket portion of such a tool is indicated at 37 in dot and dash lines in Fig. 2 of the drawing.

In establishing a coupling engagement between a pair of cylinders, or drums, similar to those indicated at 10, 10', a clamp plate 17 is first placed in operative engagement with the rims 16, 16' with the cam 29 in the raised dot-dash position, indicated in Fig. 3 of the drawing. Then the clamp plate 24 is placed in position upon the flanges 13, 13'. A tool such as that indicated at 37 is coupled with the pin 36 and the cam is swung from the dot-dash position of Fig. 1 to a position similar to that indicated in full lines in Fig. 3, in which operation the two cylinders or drums 10, 10' will be securely clamped together, facilitating storage and handling of the cylinders or drums. In the coupling engagement, the spring elements 21 and 23 serve to tensionally maintain the clamp in operative position.

It will be noted, from a consideration of Fig. 1 of the drawing, that the rings 14, 14' can be held in position adjacent the beads 11, 11' by a series of indentures, two of which are indicated at 38, 38', but a number of these may be spaced circumferentially of the rings. These are employed simply to maintain position of the rings on the cylinders or drums.

Having fully described my invention, what I claim as new and desire to secure by Letters Patent is:

1. A clamp unit of the character described, said unit comprising a pair of channelled plates, one plate having a shallow channel, the other plate having a deep channel, said plates having curved sides defining outwardly flared ends, said plates having rectangular apertures substantially centrally thereof, an elongated bar of rectangular cross-sectional form mounted in the apertures of said plates, one end of the bar having a head preventing displacement of the plates from said end of the bar, the other end of the bar having a pin with ends protruding at side surfaces of the bar, a yoke-shaped cam member pivotally mounted on said pin ends, said cam member operatively engaging the deep channeled plate of the clamp in movement of the clamp into operative position, and said cam member being housed within the deep channelled plate when the clamp is in operative position.

2. A clamp unit of the character described, said unit comprising a pair of channelled plates, one plate having a shallow channel, the other plate having a deep channel, said plates having curved sides defining outwardly flared ends, said plates having rectangular apertures substantially centrally thereof, an elongated bar of rectangular cross-sectional form mounted in the apertures of said plates, one end of the bar having a head preventing displacement of the plates from said end of the bar, the other end of the bar having a pin with ends protruding at side surfaces of the bar, a yoke-shaped cam member pivotally mounted on said pin ends, said cam member operatively engaging the deep channelled plate of the clamp in movement of the clamp into operative position, said cam member being housed within the deep channelled plate when the clamp is in operative position, and tensional means for supporting the cam and clamp in operative position.

3. A clamp unit of the character described, said unit comprising a pair of channelled plates, one plate having a shallow channel, the other plate having a deep channel, said plates having curved sides defining outwardly flared ends, said plates having rectangular apertures substantially centrally thereof, an elongated bar of rectangular cross-sectional form mounted in the apertures of said plates, one end of the bar having a head preventing displacement of the plates from said end of the bar, the other end of the bar having a pin with ends protruding at side surfaces of the bar, a yoke-shaped cam member pivotally mounted on said pin ends, said cam member operatively engaging the deep channelled plate of the clamp in movement of the clamp into operative position, said cam member being housed within the deep channelled plate when the clamp is in operative position, and said cam member having a projecting part facilitating actuation of the cam member.

4. A clamp unit of the character described, said unit comprising a pair of channelled plates, one plate having a shallow channel, the other plate having a deep channel, said plates having curved sides defining outwardly flared ends, said plates having rectangular apertures substantially centrally thereof, an elongated bar of rectangular cross-sectional form mounted in the apertures of said plates, one end of the bar having a head preventing displacement of the plates from said end of the bar, the other end of the bar having a pin with ends protruding at side surfaces of the bar, a yoke-shaped cam member pivotally mounted on said pin ends, said cam member operatively engaging the deep channelled plate of the clamp in movement of the clamp into operative position, said cam member being housed within the deep channelled plate when the clamp is in operative position, and the shallow channelled plate being narrower than the deep channelled plate.

5. A clamp unit of the chaarcter described, said unit comprising a pair of channelled plates, one plate having a shallow channel, the other plate having a deep channel, said plates having curved sides defining outwardly flared ends, said plates having rectangular apertures substantially centrally thereof, an elongated bar of rectangular cross-sectional form mounted in the apertures of said plates, one end of the bar having a head preventig displacement of the plates from said end of the bar, the other end of the bar having a pin with ends protruding at side surfaces of the bar, a yoke-shaped cam member pivotally mounted on said pin ends, said cam member operatively engaging the deep channelled plate of the clamp in movement of the clamp into operative position, said cam member being housed within the deep channelled plate when the clamp is in operative position, the shallow channelled plate being narrower than the deep channelled plate, and said deep channelled plate having, at its sides, outwardly and downwardly extending curved hook-shaped flanges.

6. The herein described means for clamping a pair of cylinders together, the cylinders having recessed ends bordered by raised annular flanges, walls of the cylinders in spaced relationship to the flanged ends having outwardly extending annular beads, rings fixed to the exterior of the cylinders longitudinally inwardly of the beads with respect to one of said flanged ends, said rings having downwardly extending annular flanges spaced from the exterior of the cylinders, a clamp comprising a channelled plate having curved sides operatively engaging the flanges of said rings, a deep channelled clamp plate defined by curved side walls joined at the base of the channel in a crosshead, said curved side walls forming outwardly flared ends on said plate, upper ends of the side walls having outwardly and downwardly extending hook-shaped flanges adapted to operatively engage the flanged ends of the cylinders, each plate having apertures, said apertures being in alinement, an elongated bar mounted in the apertures of said plates, one end of the bar having a head, preventing displacement of the first named plate from said end of the bar, the other end of the bar having a pin projecting at side surfaces of the bar, a cam member pivotally mounted on the projecting ends of said pin, said cam member being yoke-shaped in form and defined by side plates joined by a crosshead, the side plates having cam surfaces eccentric to said pin and adapted to operatively engage the crosshead of said deep channelled plate in drawing both plates into clamping engagement with the cylinders, and means on the crosshead of said cam member facilitating operation of the cam member in movement of the clamp plates into operative and inoperative positions.

7. A structure as defined in claim 6, wherein the depth of the deep channelled plate is such as to house the cam member and adjacent end of the bar within the side walls of said plate.

8. A structure as defined in claim 7, and wherein a plate spring is disposed between the first named head end of the bar and the first named plate.

9. A structure as defined in claim 8, wherein another plate spring is disposed between the cam member and the crosshead of the second named plate.

References Cited in the file of this patent

UNITED STATES PATENTS

| | | |
|---|---|---|
| 549,774 | Forst | Nov. 12, 1895 |
| 795,782 | Porter | July 25, 1905 |
| 1,254,458 | Wilson | Jan. 22, 1918 |
| 1,472,617 | Schwartz | Oct. 30, 1923 |
| 2,113,852 | Meade | Apr. 12, 1938 |
| 2,262,372 | Rogoff | Nov. 11, 1941 |
| 2,615,219 | Imparato | Oct. 28, 1952 |

FOREIGN PATENTS

| | | |
|---|---|---|
| 54,235 | France | of 1948 |
| | (1st addition to 920,788) | |